(12) United States Patent
Moutafov

(10) Patent No.: US 7,720,971 B2
(45) Date of Patent: May 18, 2010

(54) ARBITRATING AN APPROPRIATE BACK-END SERVER TO RECEIVE CHANNELS OF A CLIENT SESSION

(75) Inventor: Kamen Kamenov Moutafov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/271,439

(22) Filed: Nov. 10, 2005

(65) Prior Publication Data

US 2007/0061329 A1 Mar. 15, 2007

Related U.S. Application Data

(60) Provisional application No. 60/716,553, filed on Sep. 12, 2005.

(51) Int. Cl.
 G06F 15/16 (2006.01)
(52) U.S. Cl. .................. 709/226; 709/237; 709/214; 709/215; 709/225; 370/437; 707/200; 707/201; 707/203; 707/204
(58) Field of Classification Search ........... 709/206, 709/237, 226, 214, 215, 225
 See application file for complete search history.

(56) References Cited

U.S. PATENT DOCUMENTS

| 5,951,694 | A | 9/1999 | Choquier et al. .............. 714/15 |
| 6,629,152 | B2 | 9/2003 | Kingsbury et al. |
| 6,728,748 | B1 * | 4/2004 | Mangipudi et al. .......... 718/105 |
| 2001/0034792 | A1 * | 10/2001 | Swildens .................... 709/238 |
| 2002/0184368 | A1 | 12/2002 | Wang |
| 2003/0167303 | A1 | 9/2003 | Zhu et al. |
| 2003/0225889 | A1 | 12/2003 | Moutafov |
| 2004/0162901 | A1 * | 8/2004 | Mangipudi et al. .......... 709/225 |
| 2004/0205304 | A1 | 10/2004 | McKenney et al. |

(Continued)

FOREIGN PATENT DOCUMENTS

GB 2344035 A 5/2000

(Continued)

OTHER PUBLICATIONS

Lamport, Leslie, *Paxos Made Simple*, Internet Citation, Nov. 1, 2001, p. 1-6, retrieved from the Internet: URL:http://research.microsoft.com/user/lamport/pubs/paxos-simple.pdf.

(Continued)

*Primary Examiner*—Jude J Jean Gilles
(74) *Attorney, Agent, or Firm*—Workman Nydegger

(57) ABSTRACT

The present invention extends to methods, systems, and computer program products for arbitrating an appropriate back-end server to receive channels of a client connection. Each front-end server in a server farm specifies a back-end server in the server farm that it deems appropriate for receiving channels of a client connection. Each specified back-end server is represented by an arbitration order, for example, a universally unique identifier. A relevant set of potential back-end servers that can receive channels of a client connection is selected according to function configured to minimize performance impact. A load balancing service compares arbitration orders for different back-end servers in the set of potential back-end servers to determine an appropriate back-end server for receiving channels of the client connection.

16 Claims, 8 Drawing Sheets

U.S. PATENT DOCUMENTS

2005/0086556 A1     4/2005     Zhu et al.
2005/0149609 A1     7/2005     Lamport ..................... 709/200

FOREIGN PATENT DOCUMENTS

WO     WO 99/32956     7/1999

OTHER PUBLICATIONS

Backplane "The Backplane, Inc. Fault-Tolerant DRDBMS", pp. 1-13 Nov. 1, 2002 http://www.backplane.com/drdbms1.html.

Windows Server System Microsoft Windows Server 2003 "Windows Server 2003: The Ideal Platform for XML Web Services", pp. 1-5 Jul. 24, 2002 http://www.microsoft.com/windowsserver2003/evaluation/overview/dotnet/bestplatform.mspx.

Yasuda, et al. "Deadlock-free Fault-tolerant Routing in the Multi-dimensional Crossbar Network and Its Implementation for the Hitachi SR2001", 7 pages http://ipdps.cc.gatech.edu/1997/s9/204.pdf.

Technical Report No. 2005-10 Gidenstam, et al "Dynamic and fault-tolerant cluster management", 17 pages Chalmers | Göteborg University Göteborg, Sweden, Apr. 2005 http://www.cs.chalmers.se/~dcs/TechReports/CS_TR_2005-10.pdf.

James H. Anderson and Srikanth Ramamurthy "A Framework for Implementing Objects and Scheduling Tasks in Lock-Free Real-Time Systems", 12 pages Dec. 1996 http://www.cs.unc.edu/-anderson/papers/rtss96/pdf.

Technical Report No. 2004-02 Håkan Sundell and Philippas Tsigas "Lock-Free and Practical Deques using Single-Word Compare-And-Swap", 17 pages Chalmers | Göteborg University Göteborg, Sweden, 2004 http://arxiv.org/PS_cache/cs/pdf/0408/0408016.pdf.

"Project-Team : apache" Section: Software Inuktitut kernel pp. 1-2 http://www.inria.fr/rapportsactivite/RA2004/apache/uid38.html.

\* cited by examiner

ARBITRATING AN APPROPRIATE BACK-END SERVER TO RECEIVE CHANNELS OF A CLIENT SESSION

CROSS-REFERENCE TO RELATED APPLICATIONS

The present application claims priority from U.S. Provisional Patent Application Ser. No. 60/716,553, filed Sep. 12, 2005 and entitled "Arbitrating An Appropriate Back-End Server To Receive Channels Of A Client Session", which provisional application is incorporated herein by reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

In some computing environments, it is desirable for multiple computer systems to be able to agree on a value for a given variable without holding a central lock and being resilient to failure in any one of the computer systems while providing a scalable implementation. For example, in a distributed computing environment, it may be desirable for a number of front-end servers to determine an appropriate back-end server for receiving different channels (e.g., an IN channel and an OUT channel) of a client session. Thus, in an environment with a Web farm of multiple RPCProxy front-end servers, the RPCProxy front-end servers may need to do load balancing to a farm of back-end servers. That is, RPCProxy front-end servers need to be able to agree (or arbitrate) on which back-end server the RPC/HTTP IN and OUT channels will be sent to.

More generally, N threads/agents (e.g., front-end servers) want to set a value in M objects (e.g., back-end servers). One conventional solution to the problem is for each thread/agent to try to obtain a lock on each object in turn. After lock is obtained on all objects, the value is changed by thread and all objects are unlocked. In case of conflict, threads back off and try again.

However, there are at least several problems with this conventional solution. First, this solution has an unbound worst case scenario—conceivably, the threads can be trying to obtain a lock forever. Second, the efficiency of this solution drops as it deals with more objects. Third, retries can be resource intensive between processes/machines and thus we want to limit those to a minimum.

BRIEF SUMMARY

The present invention extends to methods, systems, and computer program products for arbitrating an appropriate back-end server to receive channels of a client connection. In some embodiments, a relevant set of back-end servers to use in arbitrating an appropriate back-end server for receiving channels of a client connection is identified. A desired order of a plurality of back-end servers is created according to a global function. The global function is configured to receive a client ID and Server ID as input and configured to provide an indication of how appropriate a back-end server is for receiving channels of a client session as output. A relevant set of one or more appropriate back-end servers from the desired order of back-end servers is selected. The relevant set is a subset of the back-end servers included in the desired order, selected according to a second function that limits the size of the relevant set such that the performance impact on the server farm is minimized.

In other embodiments, an appropriate back-end server for receiving channels of a client session is arbitrated. A load balancing service receives a first arbitration order value (e.g., a universally unique identifier) from a first front-end server that received a first channel of the client session. The first arbitration order value represents an arbitration mechanism for a first back-end server that the first front-end server is promoting as the appropriate back-end server to receive channels of the client session.

The load balancing service receives a second arbitration order value (e.g., a second universally unique identifier) from a second front-end server that received a second channel of the client session. The second arbitration order value represents a an arbitration mechanism for a second back-end server that the second front-end server is promoting as the appropriate back-end server to receive channels of the client session. The load balancing service compares the first arbitration order value to the second arbitration order value. The load balancing service selects the first back-end server as the appropriate backend server to receive channels of the client session based on the results of the comparison by the load balancing service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
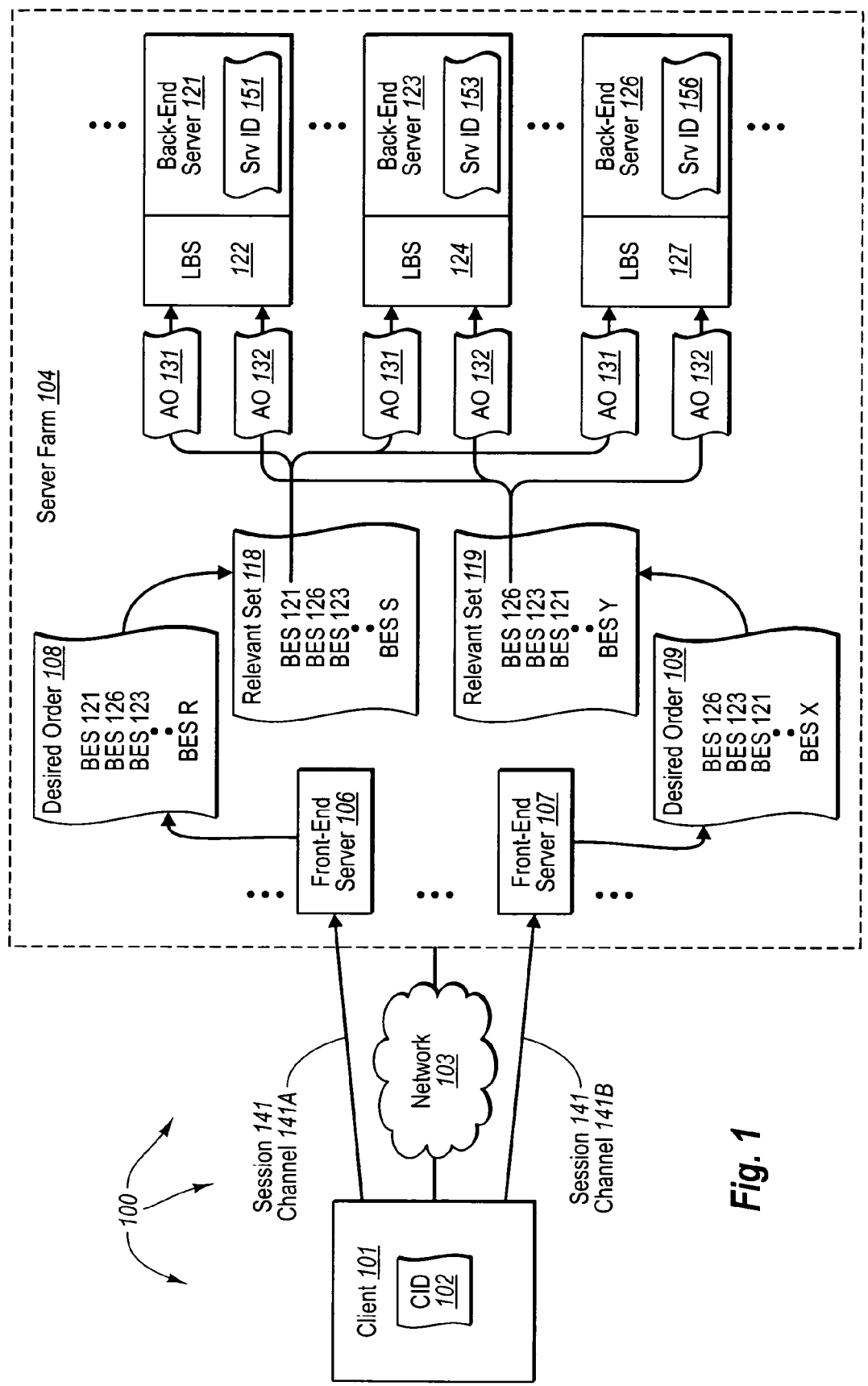
FIG. 1 illustrates an example computer architecture that facilitates arbitrating an appropriate back-end server to receive channels of a client connection.

The present invention extends to methods, systems, and computer program products for arbitrating an appropriate back-end server to receive channels of a client connection. In some embodiments, a relevant set of back-end servers to use in arbitrating an appropriate back-end server for receiving channels of a client connection is identified. A desired order of a plurality of back-end servers is created according to a global function. The global function is configured to receive a client ID and Server ID as input and configured to provide an indication of how appropriate a back-end server is for receiving channels of a client session as output. A relevant set of one or more appropriate back-end servers from the desired order of back-end servers is selected. The relevant set is a subset of the back-end servers included in the desired order, selected according to a second function that limits the size of the relevant set such that the performance impact on the server farm is minimized.

In other embodiments, an appropriate back-end server for receiving channels of a client session is arbitrated. A load balancing service receives a first arbitration order value (e.g., a universally unique identifier) from a first front-end server that received a first channel of the client session. The first arbitration order value represents an arbitration mechanism for a first back-end server that the first front-end server is promoting as the appropriate back-end server to receive channels of the client session.

The load balancing service receives a second arbitration order value (e.g., a second universally unique identifier) from a second front-end server that received a second channel of the client session. The second arbitration order value represents an arbitration mechanisms for a second back-end server that the second front-end server is promoting as the appropriate back-end server to receive channels of the client session. The load balancing service compares the first arbitration order value to the second arbitration order value. The load balancing service selects the first back-end server as the appropriate backend server to receive channels of the client session based on the results of the comparison by the load balancing service.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates arbitrating an appropriate back-end server to receive channels of a client connection. Depicted in computer architecture 100 are components of a various computer systems. The computer systems can be connected to a network, such as, for example, network 103, which is a Local Area Network ("LAN"), a Wide Area Network ("WAN"), or even the Internet. Thus, the computer systems can receive data from and send data to other computer systems connected to the network. Accordingly, the computer systems can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computer system architecture 100 includes client 101. Client 101 maintains client ID ("CID") 102. CID 102 can be a Universally Unique ID ("UUID") used to distinguish client 101 from other clients connected to network 103. Client 101 can establish session 141 to server farm 104. Sessions 141 can include a plurality of channels, such as, for example, an IN channel and an OUT channel. As depicted in FIG. 1, session 141 includes channel 141A and channel 141B.

Computer system architecture 100 also includes server farm 104. Server farm 104 includes a plurality of front-end servers ("FES") and a plurality of back-end servers ("BES"). The configuration of server farm 104 facilitates distributed processing client channels. For example, front-end servers can receive request over client channels and direct requests to an appropriate back-end server for processing. The front-end server can receive data responsive to a request and forward the data back to the requesting client.

As depicted, server farm 104 includes front-end servers 106 and 107. A series of three vertical periods (a vertical ellipsis) before front-end server 106, between front-end servers 106 and 107, and after front-end server 107 indicate that a plurality of other front-end servers can also be included in server farm 104. Also as depicted, server farm 104 includes back-end servers 121, 123, and 126. Vertical ellipsis before back-end server 121, between back-end servers 121 and 123, between back-end servers 123 and 126, and after back-end server 126 indicates that a plurality of other back-end servers can also be included in server farm 104. Each back-end server has a server ID ("SrvID"). For example, back-end server 121 has SrvID 151, back-end server 123 has SrvID 153, and back-end server 126 has SrvID 156. A SrvID can be a UUID that is used to distinguish a back-end server from other back-end servers in server farm 104.

Figure 9:
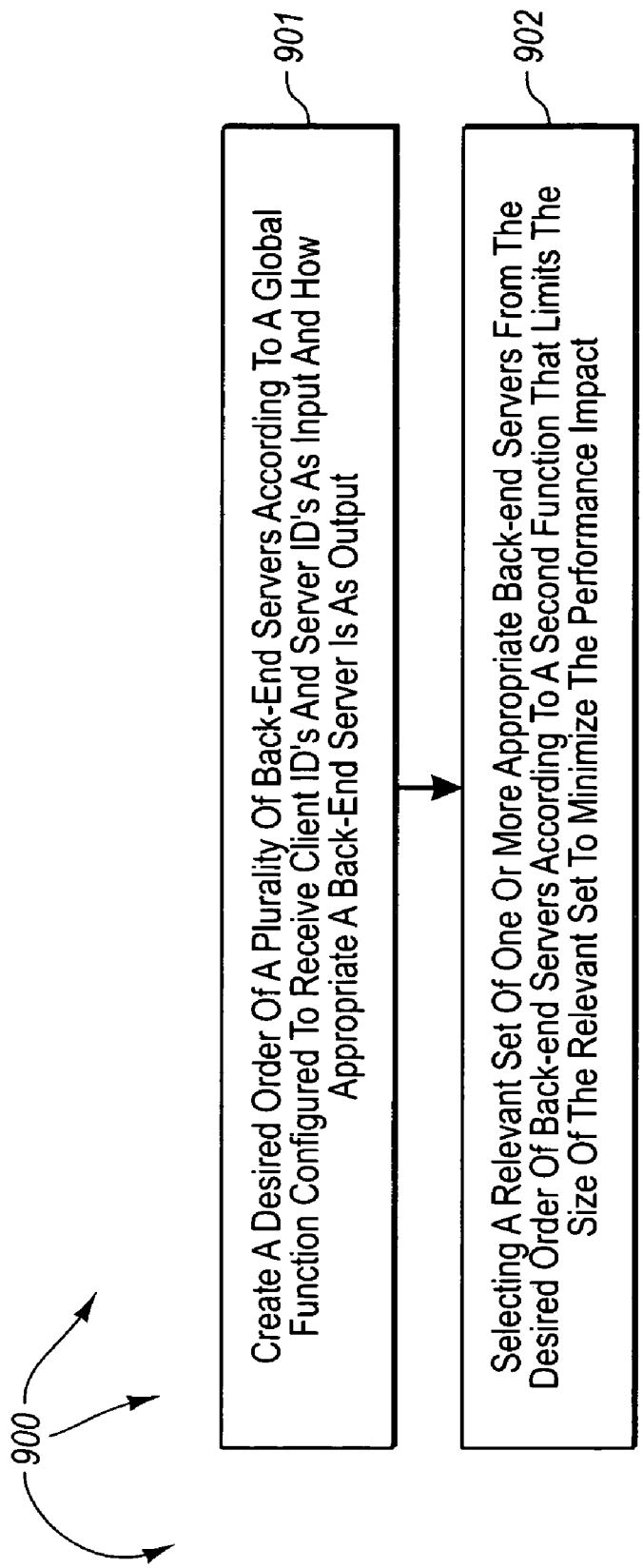
FIG. 9 illustrates a flow chart of an example method for identifying a relevant set of back-end servers to use in arbitrating an appropriate back-end server to receive channels of a client connection.

FIG. 9 illustrates a flow chart of an example method 900 for identifying a relevant set of back-end servers to use in arbitrating an appropriate back-end server to receive channels of a client connection. The method 900 will be described with respect to the components and data in computer architecture 100.

Method 900 includes an act of creating a desired order of a plurality of back-end servers according to a global function (act 901). The global function configured to receive a client ID and Server ID as input and configured to provide an indication of how appropriate a back-end server is for receiving channels of a client session as output. For example, front-end servers of server farm 104 can be configured to order all known back-end servers into a desired order ("DO") for a given CID.

Thus, front-end server 106 can create desired order 108 of back-end servers in server farm 104 for CID 102. Similarly, front-end server 107 can create desired order 109 of back-end servers in server farm 104 for CID 102. Front-end servers can use a global function F (SrvID, CID) that produces a number representative of the appropriateness of a back-end server to receive channels of a client connection. A global function can consider back-end server availability, connection quality, available bandwidth, latency, back-end available server resources (total, currently used), type of client session, protocols, etc., when gauging the appropriateness of a back-end server. The global function can be used to generate a desired order of back-end servers.

As depicted in FIG. 1, front-end server 106 generates desired order 108 and front-end server 107 generates desired order 109. It should be understood that not all front-end servers will necessarily have the same view of back-end servers when a desired order is generated. Thus, the back-end servers included in a desired order can vary between front-end servers. The number of back-end servers in a desired order can also vary between front-end servers. For example, desired order 108 includes an ordering of BES 121, BES 126, and BES 123 through BES R. Desired order 109 includes an ordering of BES 126, BES 123, and BES 121 through BES X. It should be understood that R and X can be different values.

Back-end servers closer to the top of the list can be designated as more appropriate for receiving channels of a client session. For example, front-end server 106 can designate BES 121 as more appropriate than BES 126 etc. for receiving channels 141A and 141B of session 141. Likewise, front-end server 107 can designate BES 126 as more appropriate than BES 123 etc., for receiving channels 141A and 141B of session 141.

Method 900 includes an act of selecting a relevant set of one or more appropriate back-end servers from the desired order of back-end servers (act 902). The relevant can be a subset of the back-end servers included in the desired order. The relevant set can be selected according to a second function that limits the size of the relevant set such that the performance impact on the server farm is minimized.

For example, from a desired order, each front-end server can extract a relevant set of back-end servers. In some embodiments, the relevant set is the top N back-end servers in the desired order. For example, one example equation for extracting a relevant set is N=max(SQRT(desired order set size), min(3, desired order set size)). When a front-end server is associated with a specified back-end sever, the front-end server can add the specified back-end server to the top of the list. In some embodiments, a relevant set of about 20 elements can be sustainable from a performance point of view. In general if more back-end servers are needed, one can infinitely partition the total back-end server set by CID hash into one or more zones affording practically infinite scale out.

As depicted in FIG. 1, relevant set 118 is extracted from desired order 108. Relevant set includes an ordering of BES 121, BES 126, and BES 123 through BES S, where S is less than R. Similarly, relevant set 119 is extracted from desired order 109. Relevant set 119 includes an ordering of BES 126, BES 123, and BES 121 through BES Y, wherein Y is less than X. It should be understood that S and Y can be different values.

The front-end server can generate an arbitration order ("AO") for a corresponding BES relevant set. For example, front-end server 106 can generate AO 131 for BES 121. Similarly, front-end server 107 can generate AO 132 for BES 126. An AO can be a very large number and can be a randomly generated UUID.

Front-end servers can promote BES contenders they deem the most appropriate for receiving channels of a client session appropriate to LBS instances. To promote a BES contender, a front-end server sends the generated AO for the BES contender to known LBS instances. For example, front-end server 106 can send AO 131 (promoting BES 121) to at least LBS 122, LBS 124, and LBS 127. Similarly, front-end server 107 can send AO 132 (promoting BES 126) to least LBS 122, LBS 124, and LBS 127. Other front-end servers can also send AO values promoting other BES to at least LBS 122, LBS 124, and LBS 127.

As depicted, back-end servers can include load balancing services that synchronize the selection of an appropriate back-end server for receiving channels of a client session. Thus, back-end server 121 includes LBS 122, back-end server 123 includes LBS 124, and back-end server 126 includes LBS 127. As will be described in greater detail below, a LBS determines an appropriate back-end server to receive channels of a client session based on AO values received from front-end servers.

On the back-end server side, each back-end server can also include a lookup table indexed by CID which holds a mapping from a CID (e.g., CID 102) to a session (e.g., session 141). CIDs can be included in a hash table.

Figure 2:
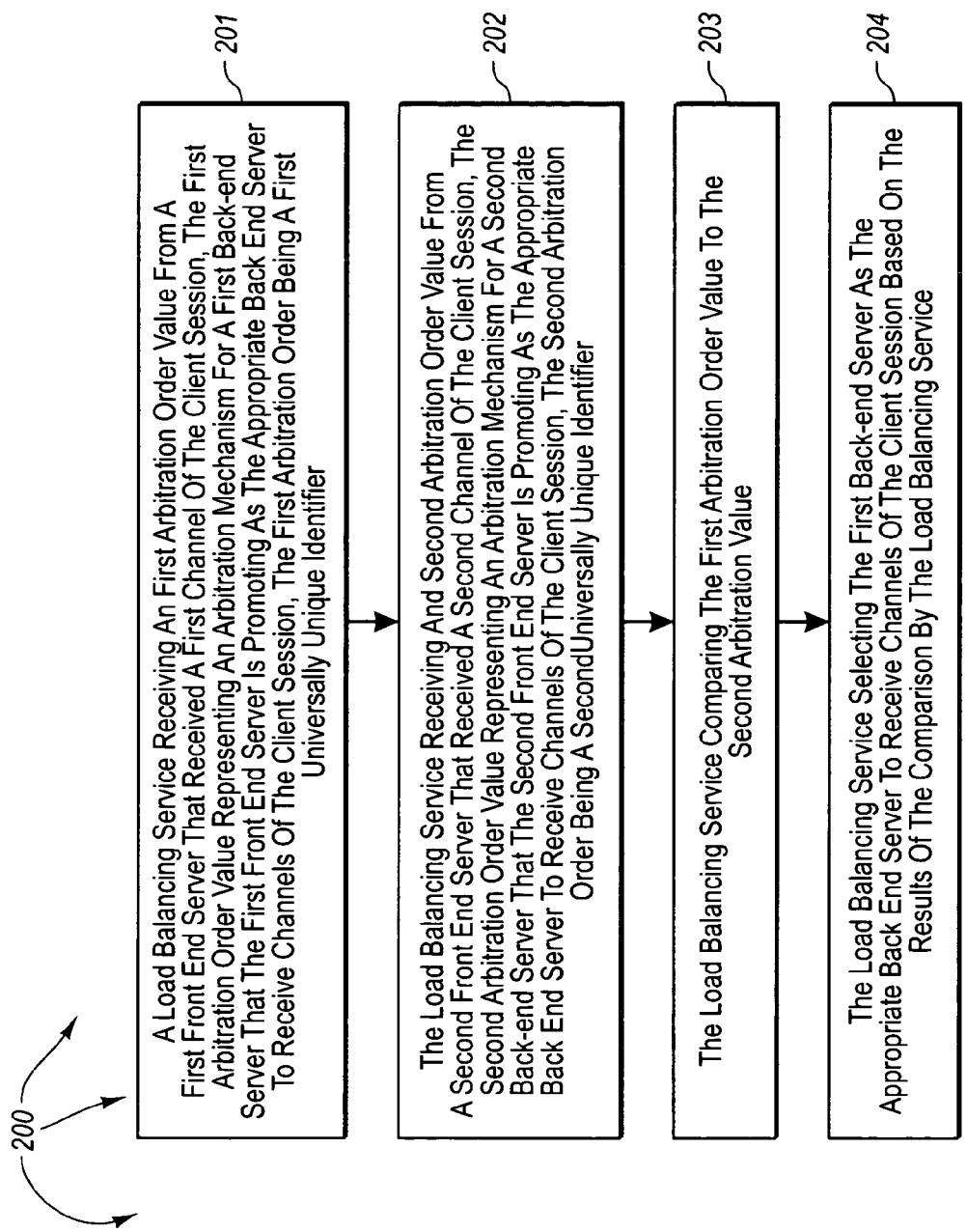
FIG. 2 illustrates a flow chart of an example method for arbitrating an appropriate back-end server to receive channels of a client connection.

FIG. 2 illustrates a flow chart of a method 200 for arbitrating an appropriate back-end server to receive channels of a client connection. Method 200 will be described with respect to the components and data in computer system architecture 100.

Method 200 includes an act of a load balancing service receiving an first arbitration order value from a first front-end server that received a first channel of the client session, the first arbitration order value representing an arbitration mechanism for a first back-end server that the first front-end server is promoting as the appropriate back-end server to receive channels of the client session, the first arbitration order being a first universally unique identifier (act 201). For example, LBS 124 can receive AO 131 from front-end server 106 that received channel 141A of session 141. AO 131 represents that front-end server 106 is promoting BES 121 as an appropriate back-end server to receive channels of session 141.

Method 200 includes an act of the load balancing service receiving an second arbitration order value from a second front-end server that received a second channel of the client session, the second arbitration order value representing an arbitration mechanism for a second back-end server that the second front-end server is promoting as the appropriate back-end server to receive channels of the client session, the second arbitration order being a second universally unique identifier (act 202). For example, LBS 124 can receive AO 132 from front-end server 107 that received channel 141B of session 141. AO 132 represents that front-end server 107 is promoting BES 126 as an appropriate back-end server to receive channels of session 141.

Method 200 includes an act of the load balancing service comparing the first arbitration order value to the second arbitration order value (act 203). For example, LBS 124 can compare AO 131 and AO 132.

Method 200 includes an act of the load balancing service selecting the first back-end server as the appropriate back-end server to receive channels of the client session based on the results of the comparison by the load balancing service (act 204). For example, LBS 124 can select BES 121 as the appropriate back-end server to receive channels 141A and 141B of session 141 based on the results of comparing AO 131 and AO 132. In some embodiments, the back-end server associated with the higher AO is selected as the appropriate back-end server. For example, back-end server 121 can be selected as a result of AO 131 being a greater number that AO 132.

Figure 3:
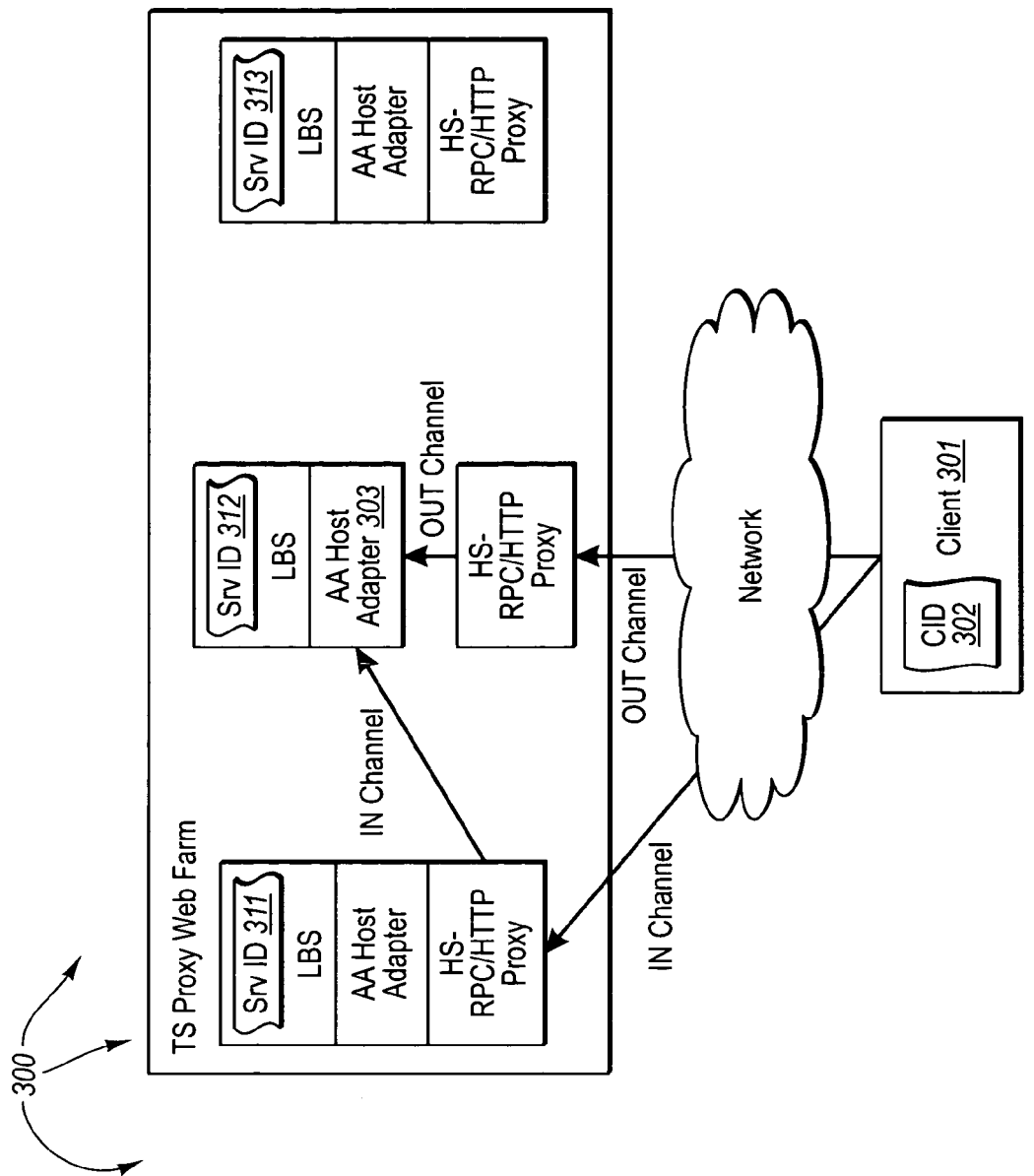
FIG. 3 illustrates an alternative example computer architecture that facilitates arbitrating an appropriate back-end server to receive channels of a client connection.

FIG. 3 illustrates an example of a computer architecture 300 that facilitates arbitrating an appropriate back-end server to receive channels of a client connection. FIG. 3 depicts an IN channel and an OUT channel of a session from 301 being directed to the same AA Host Adapter 303.

It should be understood that embodiments of the present invention include invoking a method similar to that of method 200 at a plurality of LBS instances wherein the front-end server that obtains a lock on each of the plurality of LBS instances is able to commit its contender for the appropriate back-end server.

Figure 4:
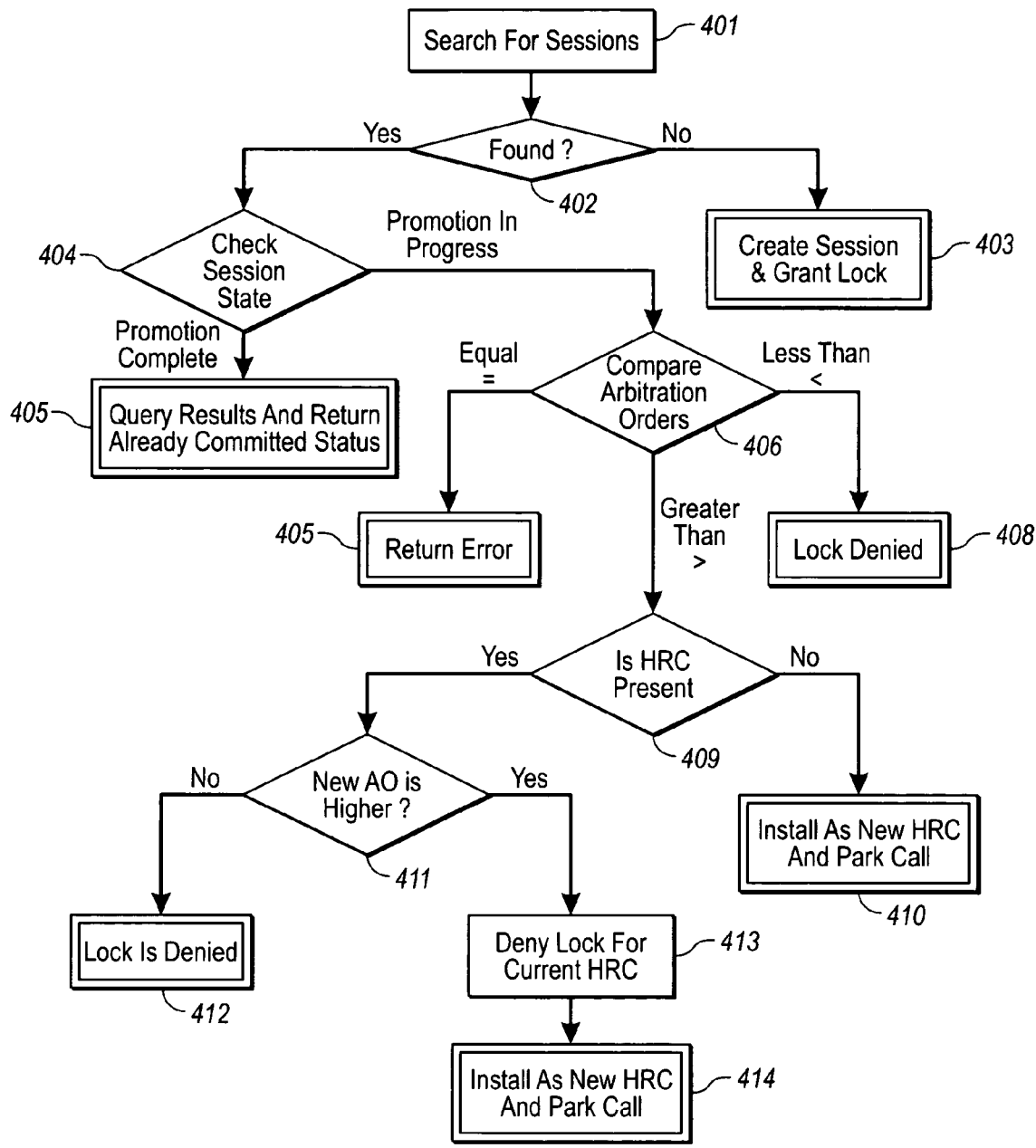
FIG. 4 illustrates a flow chart of another example method for arbitrating an appropriate back-end server to receive channels of a client connection.

For example, FIG. 4 illustrates a flow chart of a method 400 for arbitrating an appropriate back-end serves to receive channels of a client connection. Method 400 will be described with respect to components and data in computer architecture 100.

Method 400 includes an act of searching for a session (act 401). For example in response to receiving AO 131, LBS 124 can search for table entries for session 141. It is determined whether an entry for the session is found (decision block 402). If an entry is not found (NO at decision block 402), method 400 transitions to act 403. On the other hand, if an entry is found (YES at decision block 402), method 400 transitions to decision block 404.

Method 400 includes an act of creating a session and grant a lock (act 403). For example, LBS 124 can create a table entry for session 141 and grant a lock for session 141 to back-end server 121 (as promoted by AO 131). LBS 124 can record back-end server 121 as the lock owner and can record AO 131 as the value corresponding to back-end server 121.

The session state is checked to determine if a promotion process is complete for the session (decision block 404). If promotion is complete, method 400 transitions to act 405. On the other hand if promotion is not complete (or still in progress) method 400 transitions to decision block 406.

Method 400 includes an act of querying results and returning already committed status (act 405). For example, upon receiving AO 131, LBS 124 can query a table of session to determine that the appropriate back-end server for session 141 has already been arbitrated to be back-end server 126. LBS 124 can return this information to front-end server 106.

When promoting is still in progress, arbitration orders can be compared (decision block 406). For example, LBS 124 can compare AO 131 to the AO of a back-end server currently holding the lock for session 141 (e.g., to AO 132 when back- and server 126 currently ahs the lock for session 141).

When arbitration orders are equal, method 400 transitions to act 407. When a received AO is less than the AO of the current lock holder, method 400 transitions to act 408. When a received AO is greater than the AO of the current lock holder, method 400 transitions to decision block 409.

Method 400 includes an act of returning an error (act 407). Since AOs are configured to be UUIDs, receiving multiple AOs of the same value means that the values are not unique.

Method 400 includes an act of denying a lock (act 408). For example, if AO 131 is less than AO 132, back-end server 121 is denied a lock to the entry for session 141. In response to being denied a lock, front-end server 106 can revoke any locks it has at other LBS instances (e.g., LBS 122 and LBS 127). Thus, if back-end server 121 is not selected as the appropriate back-end server by LBS 124, there is little, if any, chance of an inconsistent selection of back-end server 121 at any other LBS instances.

When a received AO is greater than the AO corresponding to the current lock holder a session, it is determined if a highest ranking contender ("HRC") is present (decision block 409). When a HRC is not present (NO at decision block 409), method 400 transitions to act 410. On the other hand, when a HRC is present preset (YES at decision block 409), method 400 transitions to decision block 411.

Method 400 includes an act of installing a new HRC and parking the call (act 410). For example, back-end server 121 can be installed as a new HRC when no HRC is present. If the current lock holder (e.g., back-end server 126) revokes its lock, the installed HRC (e.g., back-end server 121) can be given the lock.

When an HRC is present, the new AO is compared to the AO of the currently installed HRC. For example if back-end server 126 is currently the HRC when AO 131 is received, AO 131 can be compared to AO 132. When a new AO is higher (YES at decision block 411), method 400 transitions to act 413. On the other hand, when a new AO is lower (NO at decision block 411), method 400 transitions to act 412.

Method 400 includes an act of denying a lock for the current HRC (act 413). For example, when AO 131 is greater than AO 132, LBS 124 can deny a lock to back-end server 126. In response to being denied a lock, front-end server 107 can revoke any locks it has at other LBS instances (e.g., LBS 122 and LBS 127). Thus, if back-end server 126 is not selected as the appropriate back-end server by LBS 124, there is little, if any, chance of an inconsistent selection of back-end server 126 at any other LBS instances.

Method 400 includes an act of installing a new HRC and parking the call (act 414). For example, back-end server 121 can be installed as a new HRC when AO 131 is greater than AO 132. If the current lock holder (e.g., back-end server 123) revokes its lock, the installed HRC (e.g., back-end server 121) can be given the lock.

Method 400 includes an act of denying a lock (act 412). For example, if AO 131 is less than AO 132, back-end server 121 is denied a lock to the entry for session 141. In response to being denied a lock, front-end server 106 can revoke any locks it has at other LBS instances (e.g., LBS 122 and LBS 127). Thus, if back-end server 121 is not selected as the appropriate back-end server by LBS 124, there is little, if any, chance of an inconsistent selection of back-end server 121 at any other LBS instances.

Further embodiments of the present invention include implementing the following algorithm to arbitrate an appropriate back-end server to receive channels of a client session. The algorithm can be used to resolve the arbitration between contenders. The algorithm will be described with reference to the components of computer architecture 300.

Each contender generates a UUID representing its AO. The purpose of this number is to help the different contenders sort out who wins in case of conflicting promotions. Each contender tries to set (or "promote") its value of choice (which may be the same value or a different value) as the value for the given CID in all LBS instances.

For each contender, each RPC Proxy sends a LockOrQuery request to each LBS in the relevant set. This provides, essentially simultaneously, its value of choice If an LBS finds a CID entry with a resolved arbitration already, it returns the query result and denies the lock. If LBS does not find a CID entry it grants the lock and records the lock owner and their AO.

If LBS finds a CID entry with a lock that has higher AO, the lock request is denied. If LBS finds a CID entry with a lock that has lower AO, the AO of the new contender is compared against the AO of the HRC. If the AO of the new contender is higher or there is not HRC present, it is moved to the HRC field (in a table entry) and the previous HRC is denied the lock. If the new contender is lower, its lock is denied.

When an RPC Proxy successfully obtains a lock on all LBS instances in a relevant set, the RPC proxy proceeds to commit the change on all LBSs instances in the relevant set. Upon receiving a commit, a LBS instances converts the HRC to a queued query and returns the result of the seeding to all pending queries. If an RPC Proxy is denied a lock, it revokes all locks it previously obtained at LBS instances and makes a Query call.

In case of conflicting arbitration results (e.g., which can happen if the relevant set becomes too thin or disjoint), the algorithm will return an error.

It should be understood that embodiments of the present invention can be implemented essentially simultaneously or sequential at a plurality of LBS instances. Accordingly, the outcome at one LBS instance can affect who is given a lock at another LBS instance.

For example, the present invention can be practiced in an environment with two Front-End Servers (e.g., FES1 and FES2) and two Back-End Servers (e.g., BES1 and BES2), where each BES has an a corresponding LBS instance (e.g., LBS1 and LBS2 respectively). It may be that FES1 tries to promote BES1 with AO 5 and FES2 tries to promote BES2 with AO 10. FES1's contender (BES1 with AO 5) gets to LBS1 first and gets the lock with AO 5. FES2's contender (BES2 with AO 10) is received subsequently and is installed as HRC with AO 10. However, to get complete the promotion, a contender needs to obtain the lock on all machines in the relevant set. Completing the promotion can occur in alternative ways.

In one alternative, FES1 gets to LBS2 first and gets the lock with its AO (which is 5). In this case it has all (both) the locks in the relevant set and it can proceed to commit the promotion. In this alternative, the HRC at LBS1 (AO 10) will be denied the lock which means it will execute a query and take the result of the promotion (BES1).

In another alternative, FES2 gets to LBS2 first and gets the lock with its AO (which is 10). Now FES2 has 1 lock and one pending HRC. FES1's contender (BES1 with AO 5) is received subsequently at LBS2. FES1 attempts to get a lock at LBS2 but is denied (since it 5<10). Once it is denied, FES1 rolls back its promotion from LBS1 and queries the result of the promotion. Once the lock on LBS1 is rolled back, LBS1 will give the HRC (BES2 with AO 10) the lock. Thus, FES2 has all (both) the locks in the relevant set and can proceed to commit the promotion (BES2).

As previously described, any number of front-end servers can participate in the arbitration. The AO serves to arbitrate between competing contenders that try to execute a promotion at the same time. As previously described, when arbitration is attempted sequentially, the first participant can obtain a lock for the session on a LBS before the second participant even tries to do it. If the second participant has higher AO (the first comparison in method 400), it will not be granted the lock, but will be installed as a Highest Ranking Contender ("HRC") for that session for that LBS. More contenders can potentially come. If they do, there may already be a lock owner and an HRC. The AO of the new contender is compared against the AO of the existing HRC and this is the second comparison in method 400.

For example, in an embodiment with 3 Front-End Servers participating in the arbitration and they want to promote Back-End Servers A, B & C respectively. The first contender (BESA) is promoted with AO 5 and since it is the only one, it will be granted the lock for that session for that LBS instance. Second contender (BESB) is subsequently promoted with AO 10. Since 10>5, it will become the HRC but will not be granted the lock. The third contender (BESC) then attempts to promote its value. If BESC's AO is 7, their request for the lock will be denied. If BESC's AO is 12, the second contender (with AO 10) will be denied the lock and the new contender will get installed as the HRC.

Figure 5:
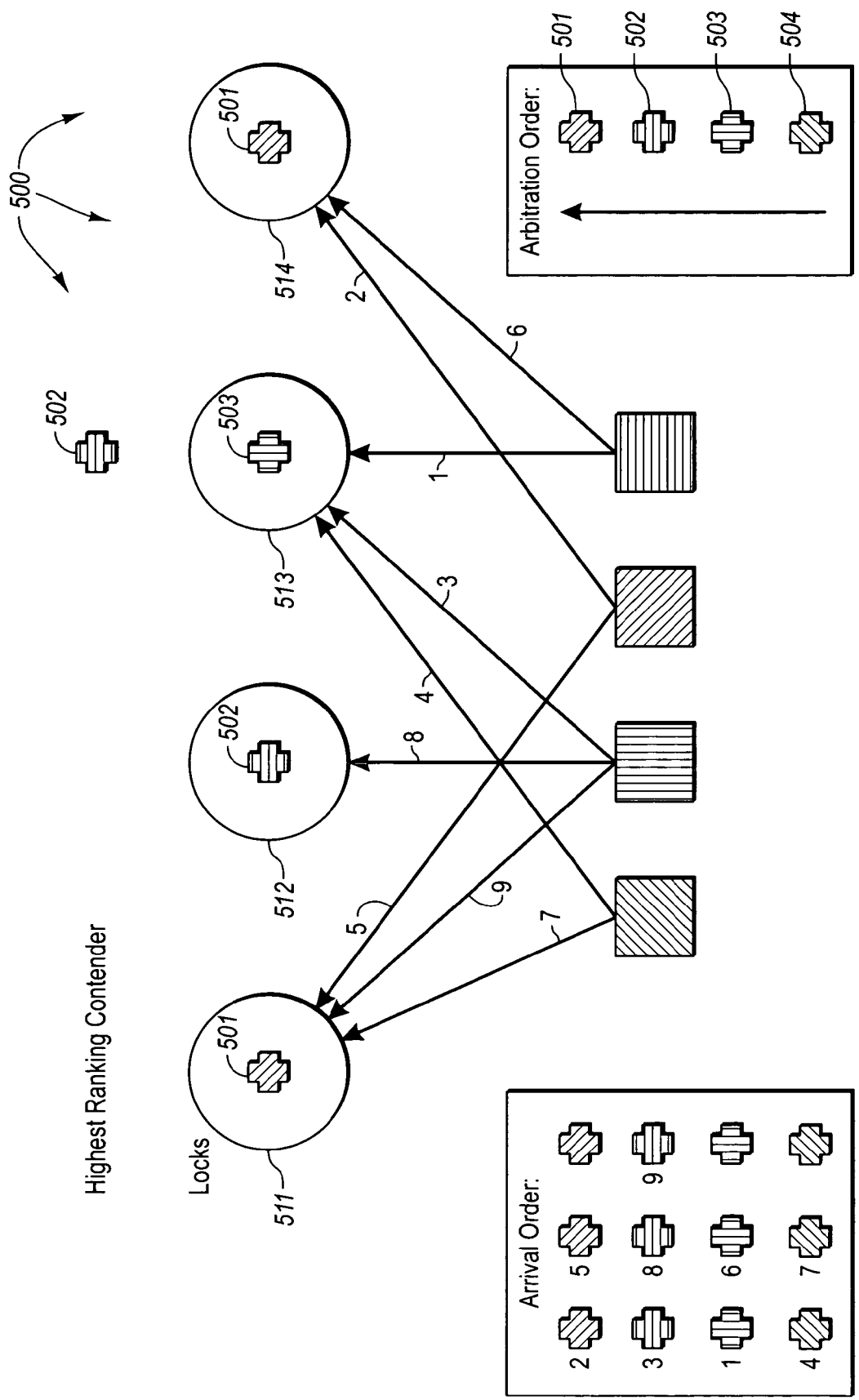
FIG. 5 illustrates an example arbitration resolution diagram.

FIG. 5 illustrates an example arbitration resolution diagram 500. Arbitration resolution diagram 500 depicts a state of a plurality of LBS locks and HRCs during arbitration. As depicted in channel arbitration diagram 500, arbitration order 501 has been assigned lock 511, since arbitration order 501 was the first received (5 is before 7 and 9). Arbitration order 502 has been assigned lock 512, since arbitration order 502 was the only received. Arbitration order 503 has been assigned lock 513, since arbitration order 503 was first received (1 is before 3 and 4). Arbitration order 501 has been assigned lock 514, since arbitration order 501 was first received (2 is before 6).

Arbitration order 502 is installed as a HRC at the LBS having lock 513 since it is a subsequently received and is higher than arbitration order 503.

However, upon completion of the arbitration resolution depicted in channel arbitration diagram 500, arbitration order 501 will eventually be selected. Upon receiving arbitration order 503 at arrow 6, arbitration order 503 will be denied a lock since arbitration order 501 (the current lock holder) is greater than arbitration order 503. As a result, arbitration order 503 will revoke all existing locks, including lock 513. This causes arbitration order 502 (a HRC) to be given lock 513.

However, upon receiving arbitration order 502 at arrow 9, arbitration order 502 will be denied a lock since arbitration order 501 (the current lock holder) is greater than arbitration order 502. As a result, arbitration order 502 will revoke all existing locks, including locks 512 and 513. Thus, only arbitration order 501 has remaining locks.

Figure 6:
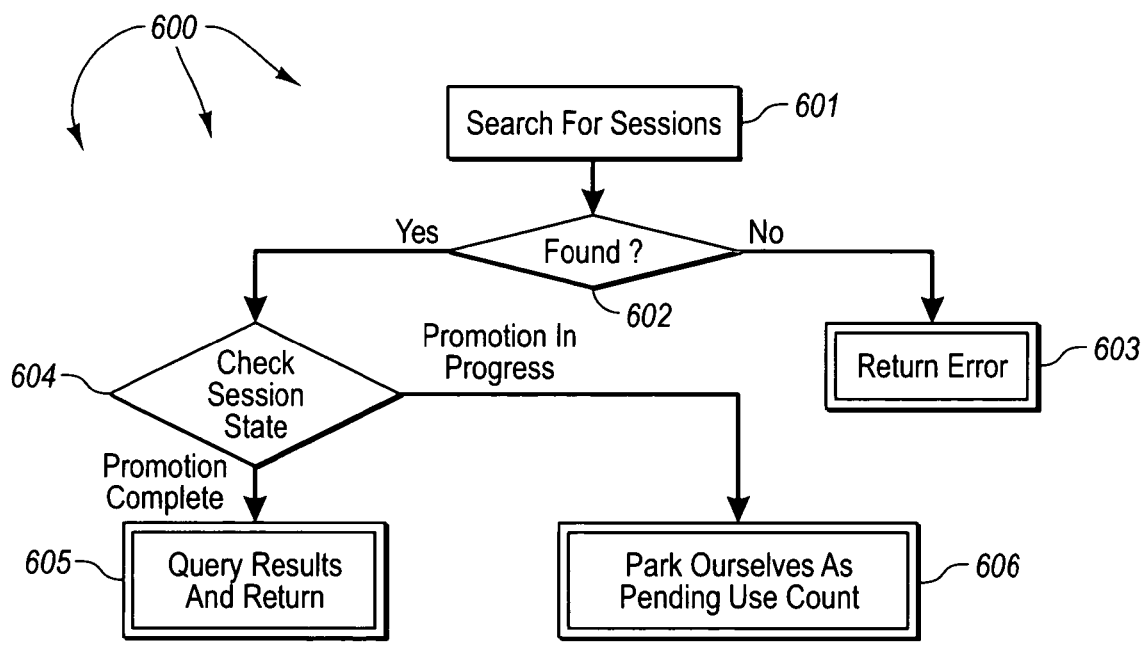
FIG. 6 illustrates a flow chart of an example method for querying a load balancing service.

FIG. 6 illustrates an example flow chart of a method 600 for querying a load balancing service. Method 600 can be utilized by a load balancing service to process a query for a client session from back-end server that has been denied a lock for the client session. The method includes searching for a session, for example, based on CID (act 601). If a session is not found (NO at decision block 602) and error is returned to the back-end server (act 603). If a session is found (YES at decision block 602), the LBS determines if promotion is complete (decision block 604). When promotion is complete, the LBS returns an indication of the appropriate back-end server to the querying back-end server (act 605). When promotion is not complete, the LBS holds the query until promotion is complete (act 606).

Figure 7:
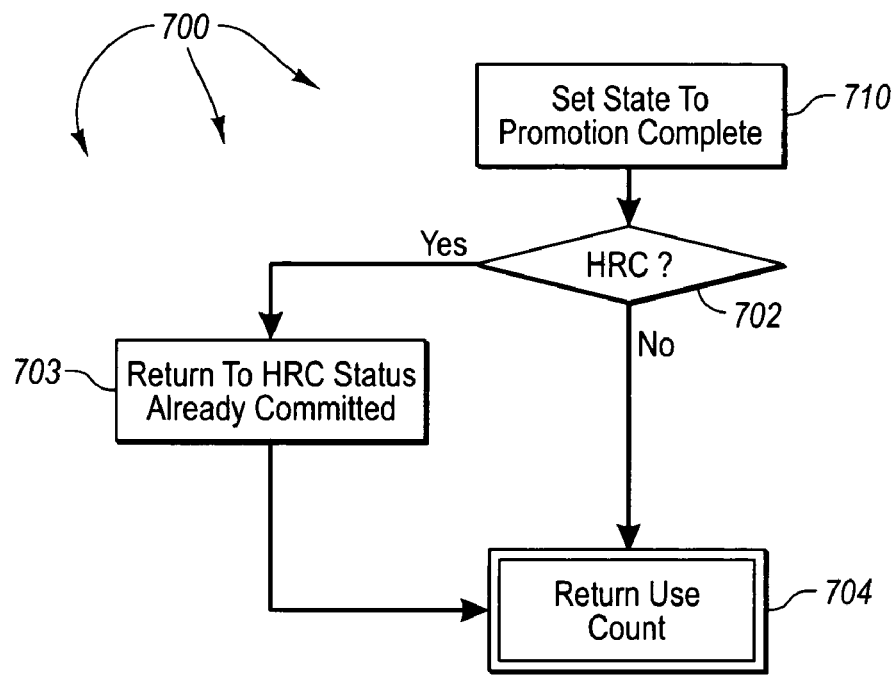
FIG. 7 illustrates a flow chart of an example method for committing a value for a selected back-end server to other servers.

FIG. 7 illustrates an example flow chart of a method 700 for committing a value for a selected back-end server to other servers. When no more contenders exist, no contenders are received after a specified period of time, or in response to some other completion event. When a back-end server obtains a lock at all LBS in a relevant set, it can be committed as the appropriate back-end server for channels of a client session. Method 700 includes an act of setting the state to promotion complete (act 701). When a promoted BES was the HRC (YES at decision block 702), the LBS returns HRC status already committed (act 703). When a promoted BES was not the HRC, (NO at decision block 702), the LBS returns the use count (act 704).

Figure 8:
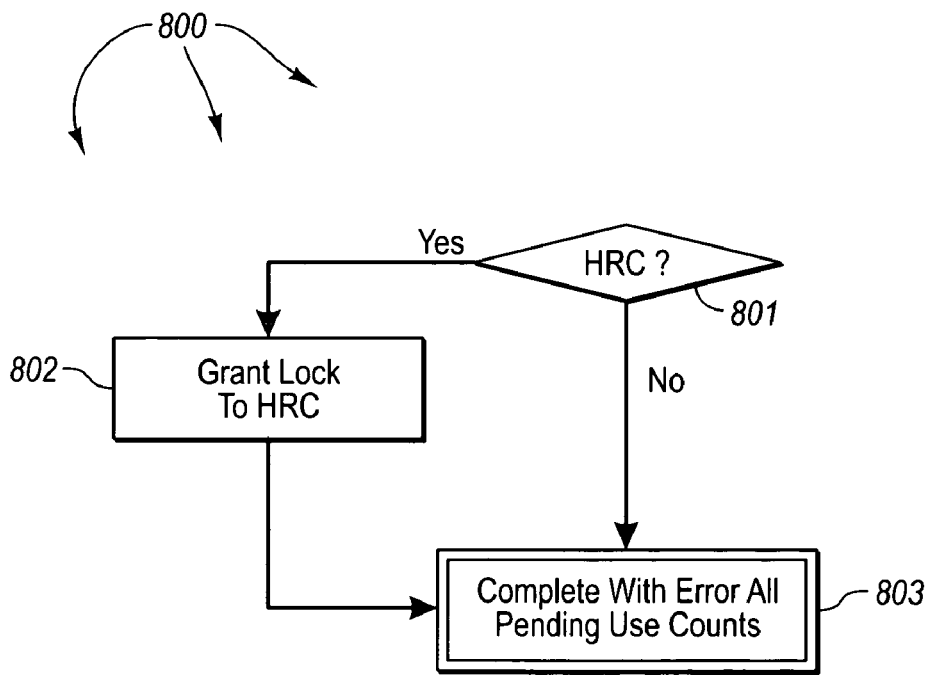
FIG. 8 illustrates a flow chart of an example method for rolling back a value for a selected back-end server to other servers.

FIG. 8 illustrates an example flow chart of a method 800 for rolling back a value for a selected back-end server to other servers. Method 800 includes determining if the LBS has a HRC (decision block 801). When the LBS includes an HRC (YES at decision block 801), the LBS grants the lock to the HRC (act 803). On the other hand, when the LBS does no include an HRC (NO at decision block 801), the LBS completes with error all pending use counts (act 803).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a load balancing service, a method for arbitrating an appropriate back-end server to receive channels of a client session, the method comprising:

an act of receiving a first arbitration order value from a first front-end server that received a first channel of the client session, the first arbitration order value representing an arbitration mechanism for a first back-end server that the first front-end server is promoting as the appropriate back-end server to receive channels of the client session, the first arbitration order being a first universally unique identifier;

an act of receiving a second arbitration order value from a second front-end server that received a second channel of the client session, the second arbitration order value representing an arbitration mechanism for a second back-end server that the second front-end server is promoting as the appropriate back-end server to receive channels of the client session, the second arbitration order being a second universally unique identifier;

an act of comparing the first arbitration order value to the second arbitration order value to determine whether the first arbitration order value or the second arbitration order value indicates a back-end server that is more appropriate for receiving channels of the client session relative to other back-end servers; and an act of selecting the first back-end server as the backend server to receive channels of the client session based on the results of the comparison determining that the first arbitration order value indicates a back-end server that is more appropriate for receiving channels of the client session relative to other back-end servers.

2. The method as recited in claim 1, wherein the computer system includes a second load balancing service, the method further comprising:

an act of the second load balancing service receiving the first arbitration order value from the first front-end server;

an act of second load balancing service receiving the second arbitration order value from the second front-end server;

an act of second load balancing service comparing the first arbitration order value to the second arbitration order value to determine whether the first arbitration order value or the second arbitration order value indicates a back-end server that is more appropriate for receiving channels of the client session relative to other back-end servers; and an act of second load balancing service selecting the first back-end server as the backend server to receive channels of the client session based on the results of the comparison determining that the first arbitration order indicates a back-end server that is more appropriate for receiving channels of the client session relative to other back-end servers such that the selection made by the first load balancing service and the second load balancing service are consistent.

3. The method as recited in claim 2, wherein the computer system includes one or more additional load balancing services, the method further comprising:

an act of each of the additional load balancing services receiving the first arbitration order value, the second arbitration order value, and one or more additional arbitration order values representing an arbitration mechanisms for a corresponding one or more additional back-end servers that are being promoted as the appropriate back-end server;

an act of each additional load balancing service comparing the first arbitration order value to the second arbitration order value and to the one or more additional arbitration order values to determine an arbitration order value indicative of a back-end server that is more appropriate for receiving channels of the client session relative to other back-end servers; and an act of each additional load balancing service selecting the first back-end server as the backend server to receive channels of the client session based on the results of the comparison determining that the first arbitration order indicates a back-end server that is more appropriate for receiving channels of the client session relative to other back-end servers such that the selection made by the first load balancing service, the second load balancing service, and each of the additional load balancing servers are consistent.

4. The method as recited in claim 3, further comprising:
an act of at least one of the additional loading balancing services granting a lock to a back-end server other than the first back-end sever for committing the arbitration order for the appropriate back-end server to other load balancing services of the computer system.

5. The method as recited in claim 1, further comprising:
an act of the first load balancing service determining that the promotion process has not yet begun for the session; and
an act of granting the first back-end server a lock for committing the arbitration order for the appropriate back-end server to other load balancing services of the computer system.

6. The method as recited in claim 1, wherein the computer system is a server farm including a plurality of front-end servers and a plurality of back-end servers.

7. The method as recited in claim 1, further comprising:
an act of denying a lock to the second-back-end server based on the results of the comparison by the load balancing service.

8. The method as recited in claim 7, further comprising:
an act of the second back-end server revoking any previously obtained locks received from other load balancing services.

9. The method as recited in claim 1, wherein the an act of the load balancing service selecting the first back-end server as the appropriate back-end server to receive channels of the client session comprises an act of installing the first back-end server as the highest ranking contender.

10. The method as recited in claim 1, further comprising an act of granting a third back-end server a lock for committing the arbitration order for the appropriate back-end server to other load balancing services of the computer system prior to comparing the first arbitration or to the second arbitration order; and
wherein the act of comparing the first arbitration order value to the second arbitration order value is for determining if the first back-end server should replace the second back-end server as the highest ranking contender.

11. The method as recited in claim 10, further comprising:
an act of denying a lock to the second-back-end server based on the results of the comparison by the load balancing service.

12. The method as recited in claim 1, wherein the first and second front-end servers are proxy servers.

13. The method as recited in claim 1, further comprising:
an act of the load balancing service comparing the first arbitration order value and the second arbitration order value to one or more additional arbitration order values prior to selecting the first back-end server as the appropriate backend server.

14. A system for arbitrating an appropriate back-end server for receiving channels of a client session, the system comprising:
a plurality of front-end servers,
a plurality of back-end servers configured to receive channels of client sessions from the plurality of front-end servers;
a plurality of load balancing services communicatively coupled to he plurality of front-end servers and communicatively coupled to the plurality of back-end servers;
each front-end server configured to:
create a desired order of one or more back-end servers from the plurality of back-end servers, a back-end server's position in the desired order indicating the back-end server's appropriateness, from the perspective of the front-end server, for receiving channels of the client session;
extract a relevant set of back-end servers from the desired order, the relevant set being a subset of the back-end servers included in the desired order;
promote a specified contender back-end server to one or more load balance services from the plurality of load balancing services as the most appropriate back-end server to receive channels of the client session; and
accept and rollback locks at load balancing services; and
each load balancing service configured to:
grant and deny locks to front-end servers for contender back-end servers selected for receiving channels of the client connection;
receive arbitration orders from front-end servers, the arbitration orders promoting contender back-end servers, arbitration orders being universally unique identifiers representing the appropriateness of a contender back-end server for receiving channels of the client session;
compare arbitration orders corresponding to different contender back-end servers; and
install a highest ranking contender back-end server based on the results of comparing arbitration orders.

15. The system as recited in claim 14, wherein each load balancing service is further configured to return an already committed status when promotion is complete.

16. The system as recited in claim 14, wherein each load balancing service is further configured to:
determine that the promotion process has not yet begun for a session when no session is found; and
grant a first back-end server a lock for committing its arbitration order for the appropriate back-end server for the session to other load balancing services of the computer system when its arbitration order value is the first received arbitration value.

* * * * *